(12) United States Patent
Gupta et al.

(10) Patent No.: US 7,239,227 B1
(45) Date of Patent: Jul. 3, 2007

(54) COMMAND INTERFACE USING FINGERPRINT SENSOR INPUT SYSTEM

(75) Inventors: Bhusan Gupta, Palo Alto, CA (US); Alan Kramer, Berkeley, CA (US)

(73) Assignee: UPEK, Inc., Emeryville, CA (US)

( * ) Notice: Subject to any disclaimer, the term of this patent is extended or adjusted under 35 U.S.C. 154(b) by 0 days.

(21) Appl. No.: 09/475,686

(22) Filed: Dec. 30, 1999

(51) Int. Cl.
 *G06F 7/04* (2006.01)

(52) U.S. Cl. ............ 340/5.82; 340/5.81; 382/124; 382/312

(58) Field of Classification Search ........... 340/5.1, 340/5.2, 5.25, 5.5, 5.53, 5.8, 5.82, 5.83, 426.28, 340/5.81; 382/124, 125, 126, 312; 435/4, 435/289.1, DIG. 22, DIG. 34, 518
See application file for complete search history.

(56) References Cited

U.S. PATENT DOCUMENTS

| | | | |
|---|---|---|---|
| 3,493,855 A | 2/1970 | Norwich | 324/61 |
| 3,641,431 A | 2/1972 | Pigage et al. | 324/61 R |
| 3,781,855 A | 12/1973 | Killen | 340/146.3 E |
| 3,873,927 A | 3/1975 | Overall | 328/4 |
| 3,967,310 A | 6/1976 | Horiuchi et al. | 357/54 |
| 4,016,490 A | 4/1977 | Weckenmann et al. | 324/61 R |
| 4,096,758 A | 6/1978 | Moore | 73/718 |
| 4,161,743 A | 7/1979 | Yonezawa et al. | 357/54 |
| 4,183,060 A | 1/1980 | Barnette et al. | 358/128 |
| 4,310,827 A * | 1/1982 | Asai | 382/125 |
| 4,353,056 A | 10/1982 | Tsikos | 340/146.3 E |
| 4,394,773 A | 7/1983 | Ruell | 382/4 |
| 4,428,670 A | 1/1984 | Ruell et al. | 356/71 |
| 4,429,413 A | 1/1984 | Edwards | 382/4 |
| 4,513,298 A | 4/1985 | Scheu | 346/140 R |
| 4,547,898 A | 10/1985 | Tsikos | 382/4 |
| 4,571,543 A | 2/1986 | Raymond et al. | 324/425 |
| 4,577,345 A * | 3/1986 | Abramov | 340/5.82 |

(Continued)

FOREIGN PATENT DOCUMENTS

EP 0 226 082 A1 6/1987

(Continued)

OTHER PUBLICATIONS

Wolffenbuttel et al., "Integrated Tactile Imager With An Intrinsic Contour Detection Option," *Sensors and Actuators*, 16:141-153, 1989.

(Continued)

*Primary Examiner*—Van T. Trieu

(57) ABSTRACT

A substrate having a fingerprint sensing system usable as a command interface using finger movements. A user's fingerprint pattern is recognized and compared to previously stored reference patterns. If the fingerprint pattern matches a previously stored pattern, the user is then permitted to enter certain commands via the same interface system. For example, in the case of an automobile, a user may identify themselves with their fingerprint, and then perform such functions as unlocking the doors, setting the seat to a selected location, or even pre-starting the car prior to their entering the automobile. The very same devices which perform the fingerprint identification and sensing are also used for the input sensing and command recognition to perform the various commands. A user is thus able to securely control desired functions in an automobile, while being assured that an unauthorized user will not have access to the automobile, even as they were able to obtain the command interface device.

31 Claims, 5 Drawing Sheets

U.S. PATENT DOCUMENTS

| | | | | |
|---|---|---|---|---|
| 4,626,774 | A | 12/1986 | Regtien | 324/61 R |
| 4,641,350 | A | 2/1987 | Bunn | 382/4 |
| 4,656,871 | A | 4/1987 | Czarnocki | 73/724 |
| 4,686,531 | A | 8/1987 | Shambroom et al. | 340/870.37 |
| 4,763,063 | A | 8/1988 | Shkedi | 324/60 CD |
| 4,814,691 | A | 3/1989 | Garbini et al. | 324/61 R |
| 4,935,207 | A | 6/1990 | Stanbro et al. | 422/68.1 |
| 4,958,129 | A | 9/1990 | Poduje et al. | 324/661 |
| 5,028,876 | A | 7/1991 | Cadwell | 324/678 |
| 5,325,442 | A | 6/1994 | Knapp | 382/4 |
| 5,373,181 | A | 12/1994 | Scheiter et al. | 257/415 |
| 5,430,381 | A | 7/1995 | Dower | 324/452 |
| 5,467,022 | A | 11/1995 | Aoki et al. | 324/661 |
| 5,493,621 | A | 2/1996 | Matsumura | 382/125 |
| 5,530,581 | A | 6/1996 | Cogan | 359/265 |
| 5,613,014 | A | 3/1997 | Eshera et al. | 382/124 |
| 5,668,929 | A * | 9/1997 | Foster, Jr. | 340/5.52 |
| 5,767,686 | A | 6/1998 | Kespohl | 324/662 |
| 5,778,089 | A | 7/1998 | Borza | 382/124 |
| 5,825,907 | A | 10/1998 | Russo | 382/124 |
| 5,828,773 | A | 10/1998 | Setlak et al. | 382/126 |
| 5,841,888 | A | 11/1998 | Setlak et al. | 382/124 |
| 5,844,415 | A | 12/1998 | Gershenfeld et al. | 324/663 |
| 5,845,005 | A | 12/1998 | Setlak et al. | 382/124 |
| 5,852,670 | A | 12/1998 | Setlak et al. | 382/126 |
| 5,862,248 | A | 1/1999 | Salatino et al. | 382/124 |
| 5,869,791 | A | 2/1999 | Young | 178/20.01 |
| 5,869,822 | A * | 2/1999 | Meadows, II et al. | 235/380 |
| 5,903,225 | A | 5/1999 | Schmitt et al. | 340/825.31 |
| 5,920,640 | A | 7/1999 | Salatino et al. | 382/124 |
| 5,936,412 | A | 8/1999 | Gershenfeld et al. | 324/663 |
| 5,953,441 | A | 9/1999 | Setlak | 382/124 |
| 5,963,679 | A * | 10/1999 | Setlak | 382/124 |
| 5,973,623 | A | 10/1999 | Gupta et al. | 341/33 |
| 6,011,859 | A | 1/2000 | Kalnitsky et al. | 382/124 |
| 6,025,726 | A | 2/2000 | Gershenfeld et al. | 324/671 |
| 6,051,981 | A | 4/2000 | Gershenfeld et al. | 324/663 |
| 6,066,954 | A | 5/2000 | Gershenfeld et al. | 324/671 |
| 6,088,471 | A | 7/2000 | Setlak et al. | 382/124 |
| 6,091,082 | A | 7/2000 | Thomas et al. | 257/77 |
| 6,114,862 | A | 9/2000 | Tartagni et al. | 324/662 |
| 6,125,192 | A * | 9/2000 | Bjorn et al. | 340/5.83 |
| 6,191,593 | B1 | 2/2001 | Tartagni et al. | 324/687 |
| 6,236,741 | B1 | 5/2001 | Kovacs-Vajna | 382/125 |
| 6,420,169 | B1 * | 7/2002 | Read et al. | 435/289.1 |
| 6,610,482 | B1 * | 8/2003 | Fodor et al. | 435/6 |
| 6,919,211 | B1 * | 7/2005 | Fodor et al. | 436/518 |

FOREIGN PATENT DOCUMENTS

| | | |
|---|---|---|
| EP | 0 397 244 A2 | 11/1990 |
| EP | 0 397 244 A3 | 11/1990 |
| EP | 0 397 244 B1 | 11/1990 |
| EP | 0 454 883 B1 | 11/1991 |
| EP | 0 455 070 B1 | 11/1991 |
| EP | 0 710 593 A1 | 5/1996 |
| EP | 0 779 497 A2 | 6/1997 |
| EP | 0 779 497 A3 | 6/1997 |
| EP | 0 786 745 A2 | 7/1997 |
| EP | 0 786 745 A3 | 7/1997 |
| EP | 0 790 479 A1 | 8/1997 |
| EP | 0 791 899 A2 | 8/1997 |
| EP | 0 791 899 A3 | 8/1997 |
| GB | 2279756 A | 1/1995 |
| GB | 2279757 A | 1/1995 |
| GB | 2312514 A | 10/1997 |
| WO | WO 97/40744 | 11/1997 |
| WO | WO 98/49691 | 11/1998 |
| WO | WO 99/28701 | 6/1999 |

OTHER PUBLICATIONS

Sarma et al., "Capacitance-Type Blade-Tip Clearance Measurement System Using a Dual Amplifier with Ramp/DC Inputs and Integration," *IEEE Transactions on Instrumentation and Measurement* 41(5):674-678, Oct. 1992.

Young et al., "Novel Fingerprint Scanning Arrays Using Polysilicon TFT's on Glass and Polymer Substrates," *IEEE Electron Device Letters*, 8(1):19-20, 1997.

Tartagni et al., "A 390dpi Live Fingerprint Imager Based on Feedback Capacitive Sensing Scheme," *IEEE International Solid-State Circuits Conference*, Feb. 7, 1997, 5 pp.

* cited by examiner

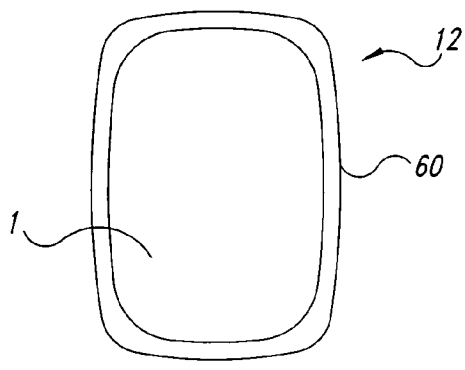
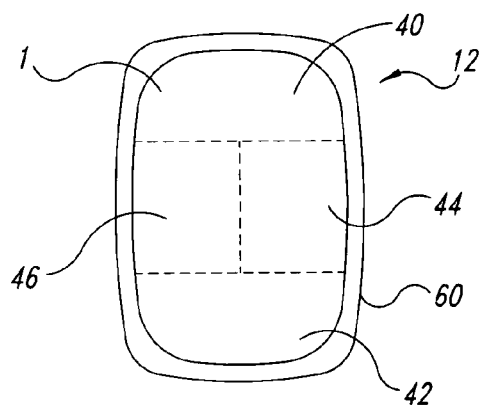
Fig. 2A    Fig. 2B
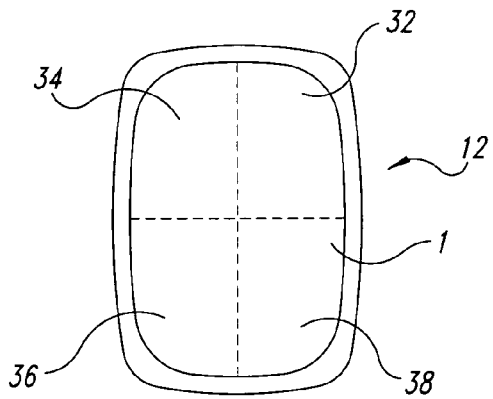
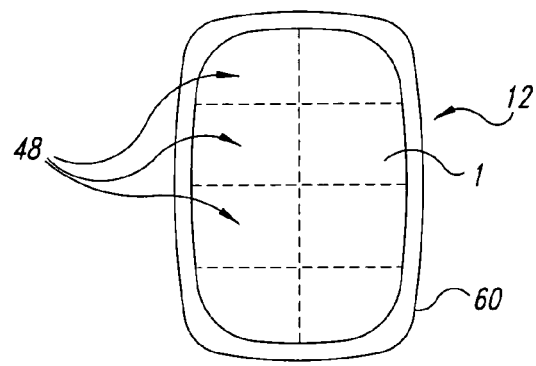
Fig. 2C    Fig. 2D
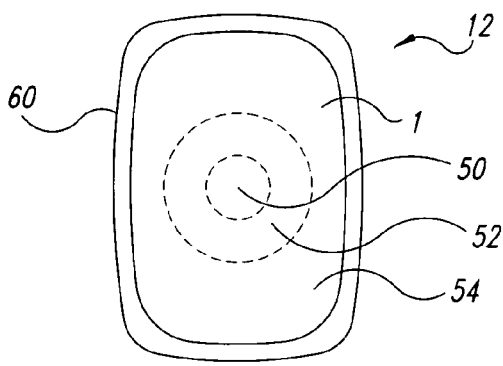
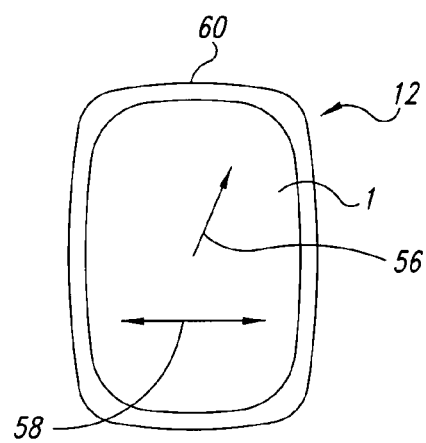
Fig. 2E    Fig. 3

COMMAND INTERFACE USING FINGERPRINT SENSOR INPUT SYSTEM

TECHNICAL FIELD

This invention is directed towards a command interface using the hand, and more particularly to a fingerprint sensor which also functions as a command input.

BACKGROUND OF THE INVENTION

Presently, automobiles are opened, closed, locked and unlocked by keys, door handles and other mechanical latching and unlatching devices. There is also available today for many automobiles a hand-held remote device with buttons thereon. Each button corresponds to a specific command. Currently, there is one button per command with the most common commands including lock doors, unlock doors, unlock trunk, set alarm, or honk horn. The user presses a specific button in order to implement and transfer the specific command to the automobile.

Remote devices currently used do not distinguish one user from another. For example, if the owner of the car drops or loses the remote activation device, a passerby may pick up the remote, which usually has the key attached thereto. Any person holding the remote device may unlock the doors, honk the horn, or perform other functions permitted by the command keys. This has created the unfortunate situation in which the security of the automobile is significantly compromised.

Formerly, if only a key was lost, any person finding the key would be required to test the physical key out on many automobiles and, given the options in a large parking lot, it difficult or impossible to find the automobile which matched the key. With current remote command devices, a passerby who has picked up the remote access device can honk the horn, turn on the lights, or perform other functions which will identify at a distance the automobile. Even at some distance, a hundred feet or more away, a person may press the command buttons which will identify the car for which he holds the key. While this is convenient for a user approaching their own car, any other person can also easily walk up and down the rows of a parking lot, pressing the command button in an attempt to locate the automobile corresponding to the remote command device. It thus provides an advantage to a thief who has obtained the remote command device and is using it in an attempt to steal the car.

SUMMARY OF THE INVENTION

According to principles of the present invention, a sensing apparatus is provided for sensing the position of a human appendage at specific locations thereon. In particular, a fingerprint sensor is provided for sensing the presence of a finger on the sensor. Further, having identified the presence of the finger on the sensor, it performs fingerprint recognition to determine whether there is a match between the input fingerprint and previously stored fingerprints.

A fingerprint sensor has positioned thereon a plurality of sensing devices. The sensing devices are electrically connected and organized into groups positioned at selected locations on the fingerprint sensor. For example, one group may be on the left hand side and the other on the right hand side. Alternatively, groups may be positioned at the top and bottom or a combination thereof. In one embodiment, the groups are positioned as concentric rings from the center outward.

Once a user activates the fingerprint sensor by placing their finger thereon and being identified as an authorized user, they can then input control commands via the same fingerprint sensor. The commands are input by moving the finger in a selected pattern over the fingerprint sensing device. For example, a movement from the top to the bottom may be interpreted as a command to turn on the lights or lock the door. A movement from left to right may be interpreted as unlock the door.

According to principles of the present invention, the fingerprint sensor is positioned in a housing that also includes an automobile transmitter. An automobile is matched with the transmitter when sold and programmed with the user's identity. Thereafter, when a user wishes to provide command inputs to the automobile he simply first applies his finger to have his fingerprint recognized as an authorized user. After the system recognizes him as an authorized user he can then input various commands to the system for performance by the automobile. For example, he can lock or unlock the doors, turn on the lights, move the seat position to a selected location, set the alarm, turn off the alarm or perform a number of other functions.

According to one embodiment of the invention, certain functions can be performed prior to the fingerprint recognition. For example, the system may permit locking of the automobile merely by touching the sensor in certain location regardless of the identify of the person performing the touch. This could be true for other selected functions such as setting the alarm system or turning off the lights. These would be functions which are typically in the class that do not compromise the security or operation of the vehicle. Indeed, they may be in the group of operations which enhances and reaffirms the security of the vehicle. Certain other functions can only be performed once a valid fingerprint has been sensed and recognized. For example, functions such as unlocking the doors, turning off the alarm, and setting the seat to the proper position will all require that an authorized user provide a fingerprint pattern and that a match be found before the functions can be performed.

The invention finds use beyond just the class of automobiles. For example, it may also be used as a house entry system, a garage door opening or closing system, turning on lights or any other number of selected functions for which identify of the user is desired to be confirmed prior to performing a certain function.

BRIEF DESCRIPTION OF THE DRAWINGS

FIGS. 2A-2E illustrate various groupings of sensing devices on the substrate according to principles of the present invention.

FIG. 3 illustrates possible movement directions that can be sensed according to principles of the present invention.

DETAILED DESCRIPTION OF THE INVENTION

Figure 1:
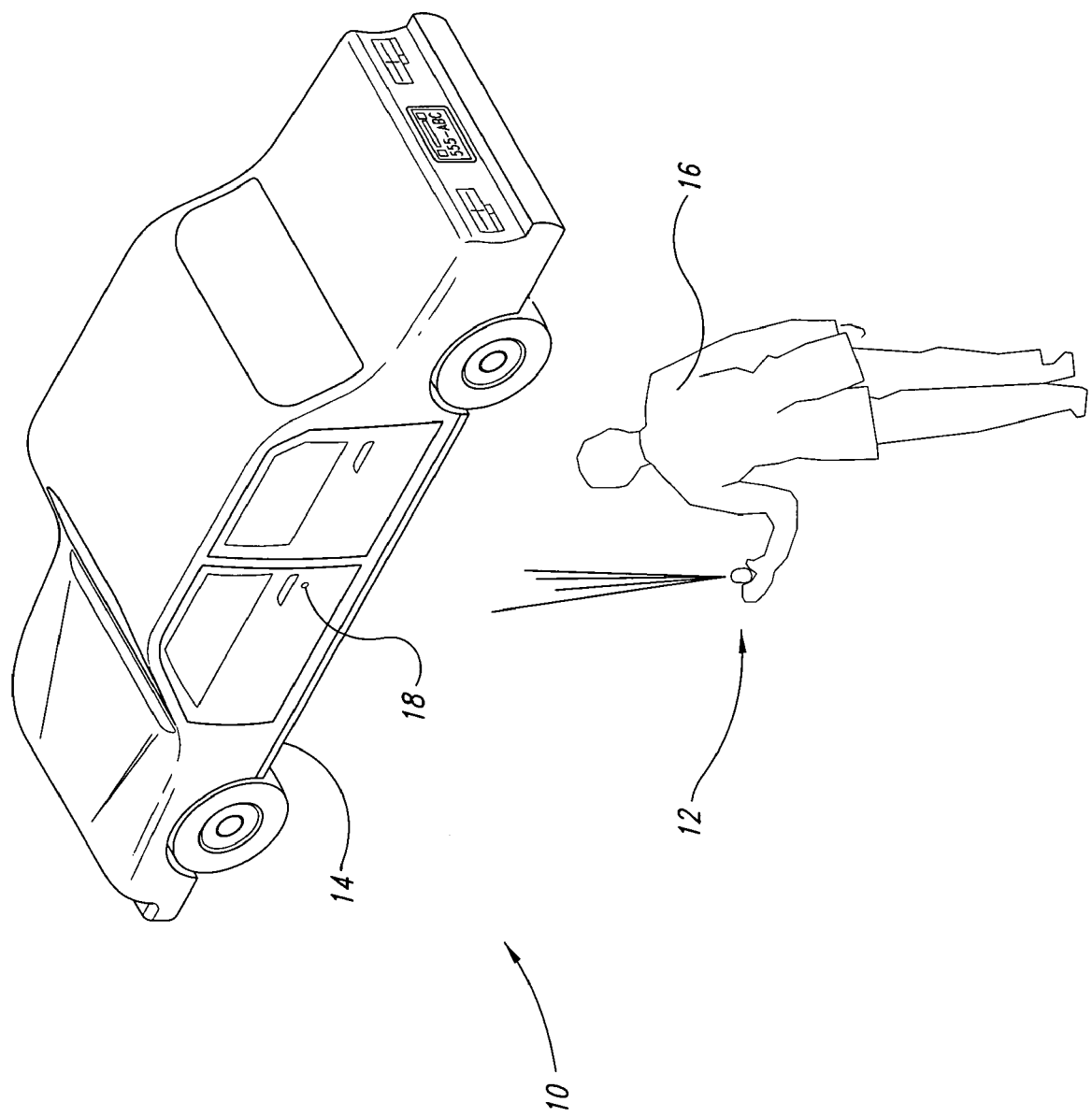
FIG. 1 is an isometric view of the use of the invention in conjunction with an automobile.

FIG. 1 illustrates a command system 10 according to principles of the present invention. The command system 10 includes a transmitting system 12 and a receiving system 14. The receiving system 14 includes an electronic receiver 18, usually embedded and not visible to the naked eye. In this case, the receiving system 14 is shown as an automobile. However, it could also be any other acceptable receiving device for which user security is desired, such as a garage, door, a home, a light or an office.

A user 16 uses the transmitting device 12 in order to send selected commands to the receiving device 14 and perform desired functions. The transmitting device 12 includes a fingerprint sensing system having a plurality of position-sensing devices as part of the array. Fingerprint sensing devices are well known in the art and any acceptable fingerprint or position-sensing device may be used. For example, an acceptable fingerprint sensing device is described in U.S. Pat. No. 5,973,623, incorporated herein by reference.

Figure 8:
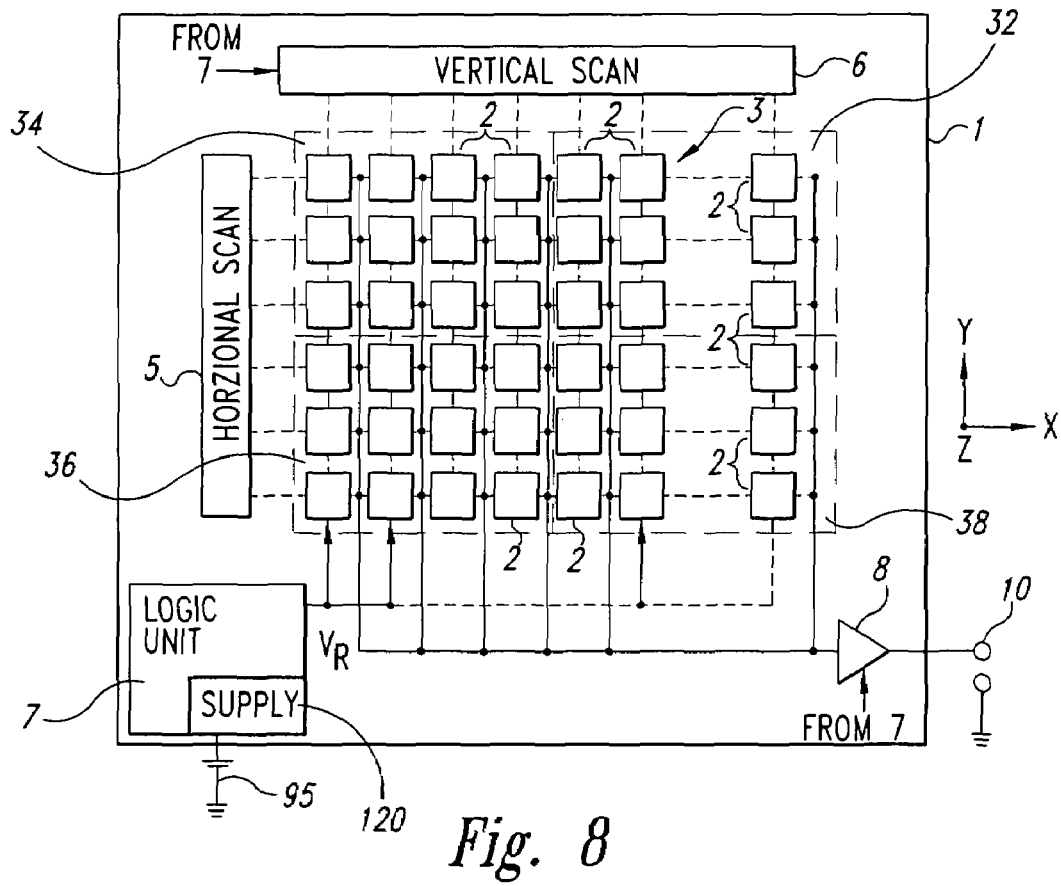
FIG. 8 is a schematic view of a fingerprint sensing device.
Figure 9:
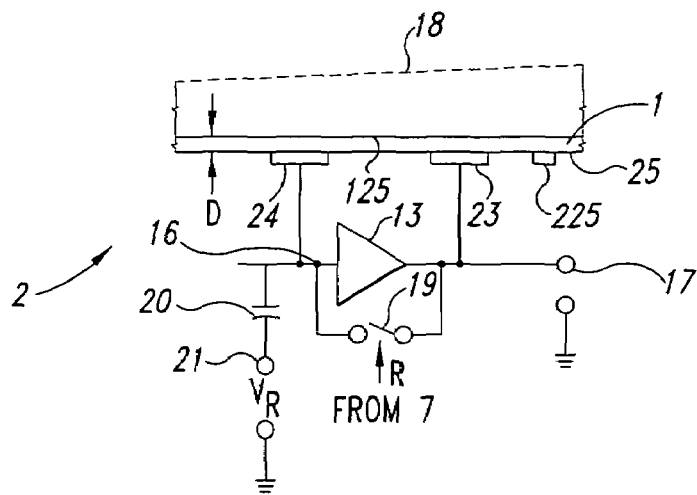
FIG. 9 is an electrical schematic of a fingerprint sensor according to the prior art.

The sensing system 12 includes a plurality of position-sensing devices as best illustrated in FIGS. 8 and 9. For convenience, a brief discussion of fingerprint sensing technology will now be provided with reference to these FIGS. 8 and 9. As shown in FIG. 8, a plurality of position-sensing devices 2 are organized in an arrays on a substrate 1. The sensing devices 2 are formed in a semiconductor substrate and thus are small so that many hundreds, or thousands, are contained on the single substrate 1. They are shown in enlarged form on FIG. 8 for purposes of illustration. As shown in FIG. 9, when the user places their finger 18 adjacent the substrate 1 the fingerprint sensing device 2 determines the position of the finger 18 relative to the sensing device 2. In particular, it senses whether a ridge or a valley or some other feature of the fingerprint is adjacent the position sensor 2. It thus not only senses the presence of either a ridge or a valley but whether or not the finger 18 is sufficiently close to register an input to the sensing device 2.

Once a finger 18 is placed on the substrate 1, the logic unit 7 in coordination with the vertical scan unit 6 and the horizontal scan unit 5 causes sensing to be performed at each individual sensing device 2. The sensing device 2 generates a signal and transmits it to the output 8. The signal is then monitored to perform other functions as explained elsewhere herein.

A power supply 120 is also provided to provide regulated power the substrate 11. In the event the voltage supply includes only power regulator transistors, it may also be on the same substrate 1 or on a separate substrate as discussed later herein. Naturally, the power source itself, such as a battery or other voltage source 95, will not be located on the substrate but will be positioned elsewhere as shown with respect to FIGS. 4 and 5.

The actual sensing of the finger 18 is performed according to one embodiment using the circuit of FIG. 9, which includes two plates 23, 24 of a capacitor for sensing the position of a finger 18. A feedback amplifier 13 is also provided having an input 16 and a reset switch 19 which is controlled according to the supply unit 7. An input capacitor 20 which is charged to a reference voltage from node 21 via power supply 95 may also be used.

The circuit for sensing the presence of the finger, and in particular the ridges and valleys, may be performed by any acceptable sensing technique, and the particular circuit shown in FIG. 9 is not required to be used. The signals from all the sensor cells 2 are analyzed or compared to a stored set of reference fingerprint patterns to locate a match. If a match is found, a signal is output, indicating a match. Rather, it is provided only as an illustration of one preferred embodiment for carrying out the sensing according to the present invention. Any currently acceptable fingerprint sensing or position-sensing devices can be used in place of those shown in FIG. 9. The full operation, and detailed description of the circuit of FIG. 9 is described in U.S. Pat. No. 5,973,623 previously referred to herein.

Referring now to FIG. 8, the sensing devices 2 can be conveniently grouped according to a selected arrangement. The grouping can be done by electronic switching or electronic configuration, either hardware or software. The embodiment shown in FIG. 8 corresponds to that shown in FIG. 2C, the individual position sensing devices 2 being shown in FIG. 2 but not being shown in FIG. 2C for ease of illustration. In particular, as shown in FIG. 2C, the array of sensing devices 2 is grouped into four preset groups 32, 34, 36, and 38. These groups are electronically segmented to sense the presence of a finger in any one of the quadrants. For example, if the finger is present in quadrant 38 but not present in quadrants 34 and 32, a specific signal is output. Similarly, an output is provided signifying that the finger is present in quadrant 32, but not present in quadrant 36 or 38. The electronic scanning, and sensing of the presence or absence of a finger is carried out as shown in FIG. 8 using the horizontal and vertical scan lines, or any other acceptable technique of the many available which are known. Simply recognizing the presence or absence of the finger in the quadrant is acceptable and it is not necessary to perform fingerprint identification. The cells 2 are used only as a position-sensing devices and are not used for fingerprint identification. Thus the same sensors 2 and circuit which were previously used for fingerprint sensing are now used for position sensing.

FIG. 2B illustrates a further preferred embodiment for segmenting the cells 2 according to principles of the present invention. The array 1 has the plurality of sensing devices 2 thereon segmented into an upper group 40, and a lower group 42. In addition, they are also segmented into a right side group 44 and a left side group 46. The presence of a user's finger in section 42 can thus easily be distinguished from the presence of the user's finger in section 40. Similarly, sections 44 and 46 can be easily distinguished from each other. FIG. 2D illustrates a further alternative embodiment having a plurality of groups of position-sensing devices organized into different groups 48. According to the embodiment of FIG. 1, there are eight different segments of groups of the position-sensing devices 2 thus illustrating that. The number of groups can be any desired number ranging from 1 to 8 or more. For example, in one embodiment, only two groups are provided, upper and lower, or left and right, as can be easily understood by looking at FIGS. 2B and 2C, thought this embodiment is not shown. Similarly, a left and right side can be combined by software electronics with the top and bottom segmentation into groups.

FIG. 2E illustrates a concentric grouping of the position-sensing devices 2. In particular, it includes a central group 50, one outer ring 52, which surrounds and is on the outside of group 50, and a further outer ring 54, which surrounds, and is on the outside of group 52. The polar, coordinate method, or circular groups, is particularly useful to provide certain types of input, as will now be explained with respect to FIG. 3.

FIG. 3 illustrates possible input command directions 56 and 58 for movement of the finger 18 on the substrate 1. As shown by arrow 58, the user may sweep their thumb from left to right at any position on the sensor 1, such as near the bottom, near the middle, or on the top. Alternatively, the user may move their thumb from top to bottom or from the center outward, if the polar coordinate embodiment of FIG. 2E is in use. FIG. 3 illustrates, with arrow 56, the concept of first touch location and a last touch location. As can be seen by viewing the end of arrow 56, a user's finger first touched the array 2 in the center portion, group 50. The user's thumb then moved from the center portion in a 45° direction upward, crossing two segments, namely segments 52 and 54. As shown by the raised arrowhead, the user's thumb left the substrate 1 in the upper right hand corner of segment 54, see, for example, FIG. 2E. Similarly, arrow 58 represents the user moving their thumb in a horizontal sweep to the left and right across the central portion of the substrate 1 with the user's thumb going up, out of range of the sensor on both the left and right side during the sweep.

According to principles of the present invention, a user is able to provide commands to a system using merely motion of the thumb, or the finger (once again, recall that the thumb is classified as a finger for ease of reference. Indeed, in most embodiments, the user will find the thumb the most useful finger to use for the present invention, though this does not exclude the use of a finger or, for the disabled persons, without hands, the use of a toe or other identifiable appendage). The sensor system 12 has stored therein a plurality of commands which have been preprogrammed, samples of which will now be provided. For this example, the sensor is used with an automobile. The sensor recognizes a location of a first touch as the finger enters contact with the substrate, and the location of the last touch as the finger leaves the substrate. The sensor also recognizes movement to one location or another while the finger is on the substrate. The user, the commands, and the input for such commands can be any desired configuration as selected by the system designer or the user. For example, if the user enters the touch pad at the lower portion and exits at the upper portion, as would be expected from sweeping their thumb from the bottom to the top. This can indicate that the car should be locked. If the user sweeps their hand from the top to the bottom, this can indicate that the car should be unlocked. Movement from left to right can provide a command input to turn on the lights while movement from right to left can turn off the lights.

Among the more useful commands which can be entered would be those to set the seat position to match the identity of the user who is about to enter the car. Other custom features may include setting the radio to the correct stations, setting the steering wheel to the proper location, or other commands which are specific to a user. Any number of other acceptable commands can be performed, such as roll-up windows, roll-down windows, roll down one or more particular selected windows, engage alarm system, disengage alarm system, and many others which need not be catalogued here but they all fall within the concept of the command interface using the fingerprint sensor system.

Figure 4:
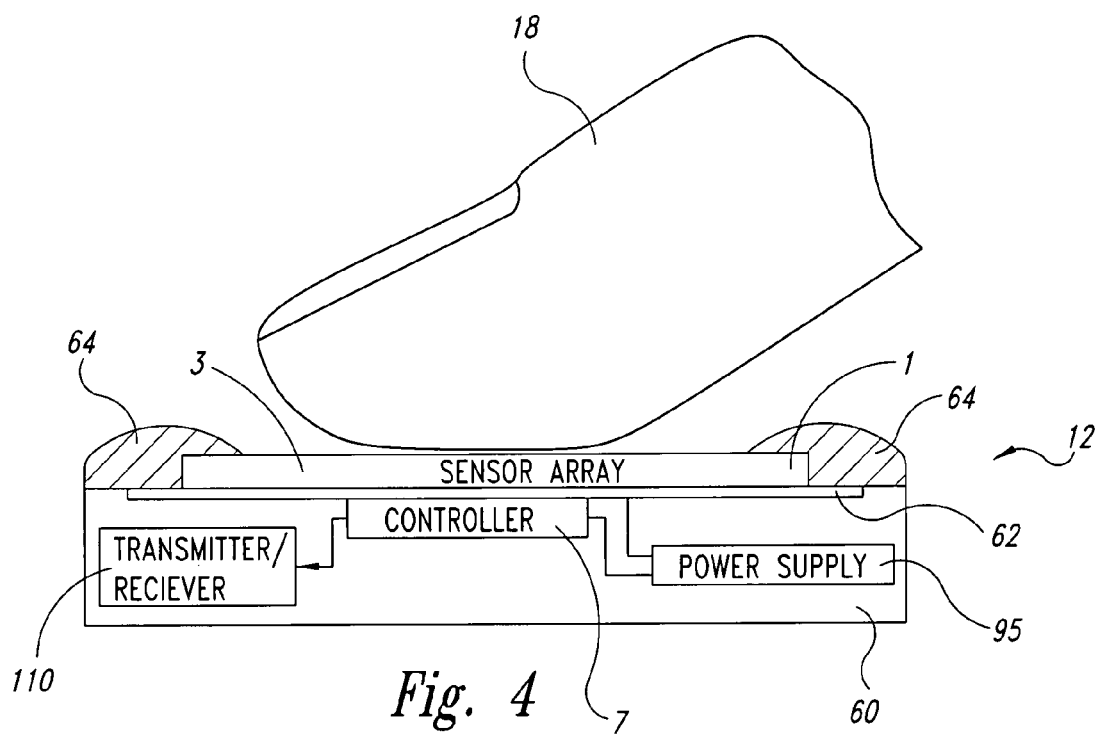
FIG. 4 is a partial cross-sectional, cutaway view of a housing and sensor according to principles of the present invention.

A method of operation of the fingerprint sensor system will now be described with reference to FIGS. 3, 4 and 8. A user presents their finger 18 to the substrate 1 which contains the sensing devices 2 as shown in FIGS. 4 and 8. The system performs the recognition sequence for a pattern match to determine if the fingerprint is a match to the pattern of a fingerprint previously stored for that of an authorized user. If there is a match, then the controller 7 authorizes the input of a selected group of functions, such as those previously described. For example, following the correct identification of an authorized user, the user may then use finger movements to unlock the doors as they approach the car. They may then use finger movements to change the seat to a selected position, which has been custom preset to them as an individual since the identity of the user is known from the fingerprint. Through other commands input through their thumb moving across the sensor array 2, they may input a desired temperature control system, whether heating or cooling, a radio station, or other custom details to themselves to begin operation as soon as the car is powered up. As can be appreciated, numerous other functions can also be performed following the fingerprint identification, such as enabling or disabling an alarm system, turning the lights on or off, or other selected functions some of which are customized to the particular user.

According to principles of the present invention, a large number of functions can be performed prior to or in the absence of a fingerprint identification. For example, it is desired that the car will automatically lock itself, or turn the lights off, in the event of an attempted unauthorized use. Accordingly, some of the functions according to the present invention are performed prior to the fingerprint identification taking place. Using the very same sensor elements 2 which also perform the fingerprint sensing. For example, according to principles of the present invention, locking of the car can be performed by random, rapid movement of a finger across the array in addition to being performed by movement in a selected location across the array. Similarly, the lights can be turned off by repeatedly holding a finger on the array. These functions can be performed in a silent fashion, so that the horn is not honked when the car is automatically locked prior to fingerprint recognition. Similarly, the windows can be rolled up, the lights turned off, or other basic service functions performed by any person holding the system 12 prior to fingerprint recognition. However, fingerprint identification is required prior to performing certain selected secure functions.

The usefulness of secure/unsecure grouping of functions can be appreciated in the following explanation. Assume, for example, that the present invention falls from the user's pocket in a parking lot. A passerby, picking up the sensing device, may attempt to activate the car, so as to locate and thus steal the automobile. If the person places their finger on the array, the only possible things they can do are those which make the car more secure, such as locking the doors, setting the alarm or, alerting the car system that an unauthorized user is attempting repeated entry and thus can make itself more secure. For example, after repeated failures to recognize a print, it could send an alarm via radio transmitter from the automobile to a security company which can then alert the owner that someone is attempting to steal the car. Additionally, a user can hand the keys to a family member, such as a son or a daughter, and ask them to lock the car or turn the lights off and roll the windows up using the remote sensing system. The person may not be an authorized driver of the vehicle, and thus their fingerprint pattern would not match an authorized user pattern. However, they would be able to perform routine functions, such as locking the doors, rolling up the windows and activating the alarm system.

Figure 5:
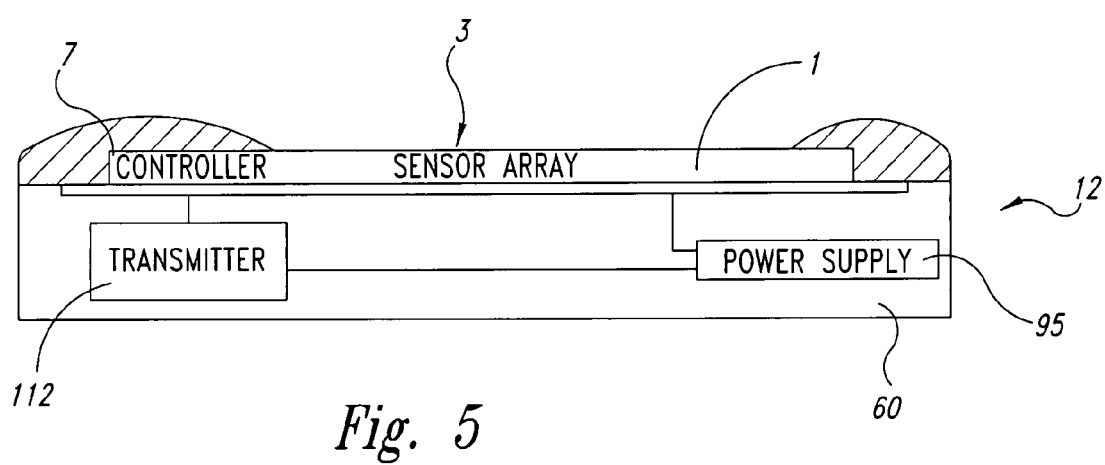
FIG. 5 is an alternative embodiment of the housing of FIG. 4.

FIGS. 4 and 5 illustrate possible configurations for the command interface system 12. A housing 60 includes the substrate 1 having an array 3 of sensor devices 2 formed thereon. A printed circuit board 62 supports the substrate 1 to provide both physical mechanical support and electrical connection. Waterproof seals 64 ensure that the sensor array 3 is not damaged by the weather, or other outdoor adverse conditions. The housing 60 includes a power supply 95 and a transmitter and/or receiver unit 110. For example, the receiver unit 110 may be used to receive customization controls, such as adding a user, changing the software commands, or the like.

A controller 7 is connected to the PC board 62 and, in the embodiment shown, is connected to the same PC board, however on the back side. The housing 60 also includes the appropriate mounting, not shown, in order to support and hold the power supply, printed circuit board 62, and transmitter/receiver in the correct orientation. According to the embodiment of FIG. 4, the controller 7, which has the circuits thereon to perform the sensing, recognition, storing of command sequences, reference fingerprint patterns, and the like.

FIG. 5 illustrates an alternative embodiment of the device of FIG. 4. According to this alternative embodiment, the housing 60 includes the power supply 100 and a transmitter 112. In this embodiment, the same substrate 1 includes the sensor array 2, and the electronics for the controller 7. Thus, included on the single integrated circuit, are both the sensor elements, transmitter driving circuits, as well as the recognition units and electronics to drive the transmitter. In some embodiments, it is preferred to have the control logic and drive transmitter circuits in a separate stand-alone substrate as shown in FIG. 4, while in other embodiments, having it as a single integrated circuit on the same substrate 1 is preferred.

Figure 6:
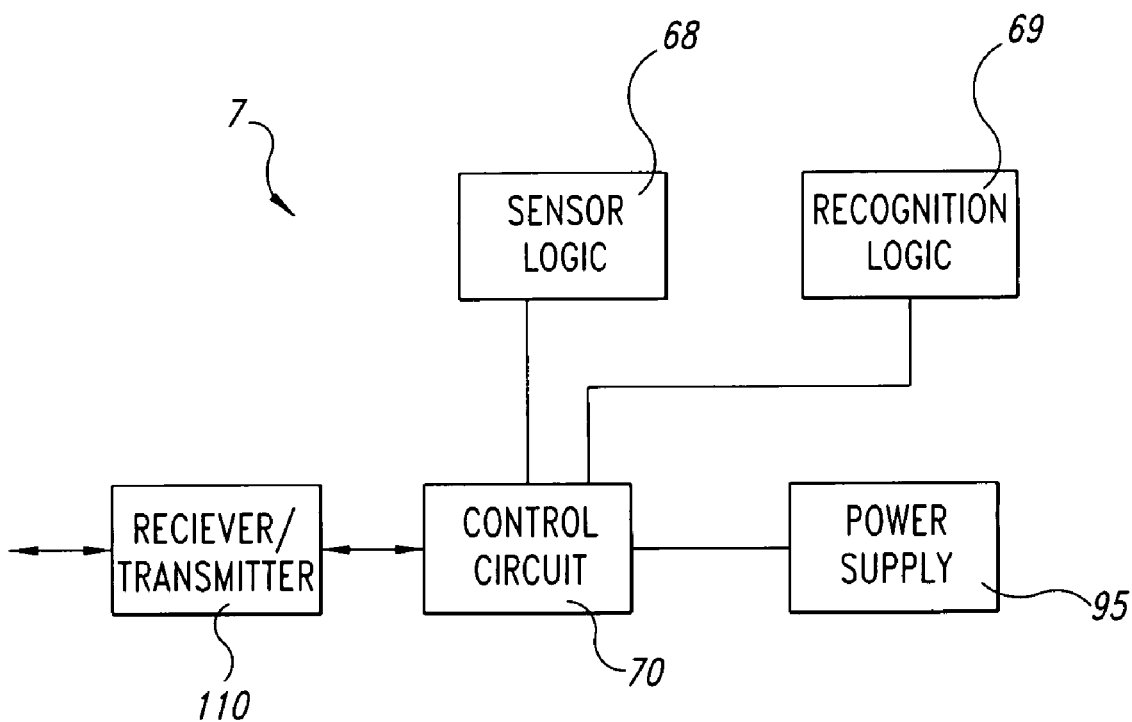
FIG. 6 is an electrical schematic of circuits for use according to principles of the present invention.

FIG. 6 illustrates an electrical schematic of the circuit according to the present invention as shown in FIG. 4. The controller 7 is connected to sensor logic 68, which includes the sensor cells 2 and the appropriate drive logic, including the horizontal scan, the vertical scan, and output sensors, as previously described. It also is connected to the recognition logic 69, which has the appropriate memory for storing reference fingerprint patterns, as well as command sequences as previously described. The power supply 95 provides power through a central control circuit 70, which is in the form of a microprocessor for performing coordination of the various functions as described herein.

Figure 7:
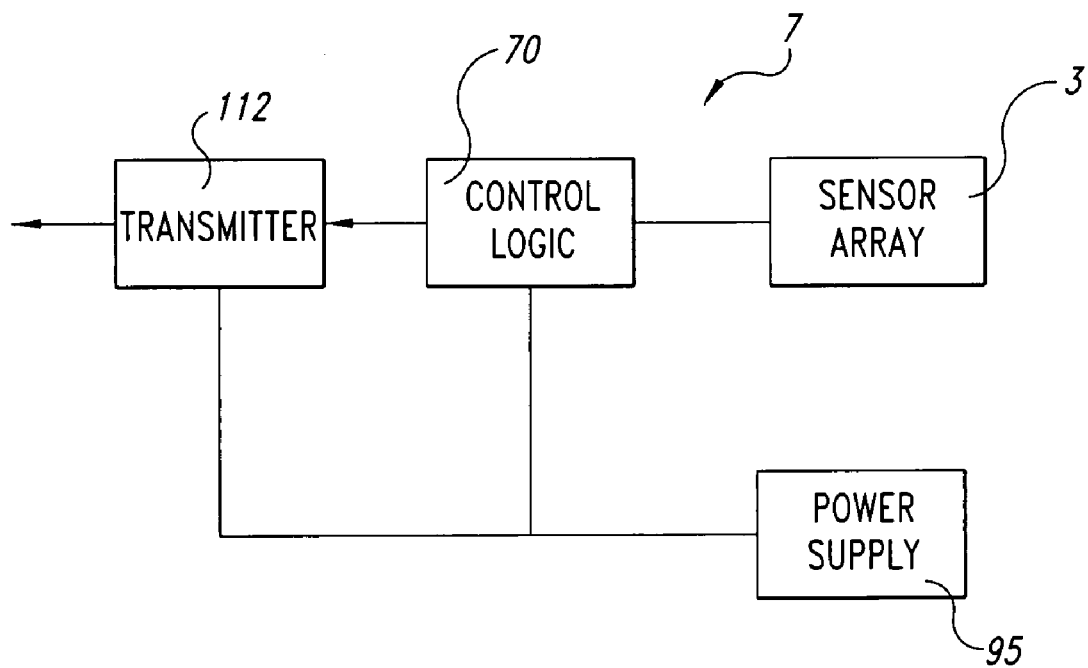
FIG. 7 is a schematic of an alternative embodiment of a circuit according to principles of the present invention.

FIG. 7 illustrates another embodiment of the present invention, as shown in FIG. 5. According to this embodiment, the control logic 70 includes within it all of the sensor circuits, the recognition circuits, the memory circuits and other components needed. The sensor array 3 containing the plurality of sensor elements 2 is located in a different portion of the same semiconductor substrate. Control of the transmitter 112 is directly driven from the control logic 70 positioned on the substrate 1.

The present invention has been described with respect to a number of specific embodiments, including the control of an automobile, lights, a garage, or other secured location. Alternative embodiments can be easily provided which fall within the scope of the present invention.

The invention claimed is:

1. An apparatus comprising:
   a substrate;
   a plurality of position sensing devices located on the substrate for detecting the presence of an object;
   a plurality of groups of the position sensing devices, each group being composed of a plurality of sensing devices and each group being electronically segmented and each group being located at a selected, respective position on the substrate;
   an electronic logic circuit coupled to each of the groups for sensing whether a human appendage has been placed adjacent the respective group.

2. The apparatus according to claim 1 wherein the plurality of groups includes at least 3 groups.

3. The apparatus according to claim 2 wherein the groups are positioned adjacent each other organized in a grid having rows and columns.

4. The apparatus according to claim 2 wherein the groups are positioned with a first group surrounding a second group and the second group surrounding a third group.

5. The apparatus according to claim 4 wherein the groups are circular in shape.

6. The apparatus according to claim 1, further including a circuit for sensing an initial touch location and a last touch location.

7. The apparatus according to claim 1, further including a circuit for sensing the location of a human appendage on the surface at a first time and sensing the location the human appendage at a second time, after the first time.

8. The apparatus according to claim 1, further including:
   a housing that supports the substrate;
   a power source within the housing; and
   a transmitter within the housing.

9. The apparatus according to claim 8, further including:
   a fingerprint identification circuit within the housing including a fingerprint sensing array, a memory for storing reference fingerprint patterns and a circuit to compare a fingerprint sensed by the array with a reference fingerprint pattern stored in the memory.

10. An apparatus for remotely controlling automobile functions comprising:
    a housing;
    a semiconductor substrate coupled to and supported by the housing;
    a power source within the housing;
    a transmitter within the housing;
    a plurality of position sensing devices positioned within the semiconductor, the sensing devices being organized into a plurality of segmented groups; and
    a circuit coupled to each group to sense whether a human appendage is adjacent the group.

11. The apparatus according to claim 10, further including:
    a fingerprint identification circuit coupled to the semiconductor substrate for sensing the identity of the a fingerprint placed thereon.

12. The apparatus according to claim 11 wherein the fingerprint identification circuit includes:
    a memory for storing a plurality of reference fingerprint patterns;
    a comparison circuit for comparing a pattern of a fingerprint placed on the substrate with a reference fingerprint pattern stored in the memory; and
    an output circuit that outputs a signal indicating a match between an input fingerprint pattern and the reference fingerprint pattern stored in the memory.

13. The apparatus according to claim 12, further including an enable circuit coupled to the output circuit for enabling the transmitter to transmit selected commands only after a fingerprint input pattern has matched a reference fingerprint pattern.

14. The apparatus according to claim 10, further including:
    an automobile;
    a receiver circuit coupled to the automobile for receiving input from the transmitter.

15. A method of sensing input from a finger of a user comprising:
sensing a first touch location on a substrate at a first time;
sensing a second touch location spaced from the first touch location on the substrate at a second time, after the first time;
comparing an input location sequence of the first and second touch locations to a set of reference location sequences stored in a memory;
outputting a signal indicating a match between the input location sequence and the reference location sequence;
performing a pre-programmed function based the signal of the match.

16. The method according to claim 15, further including:
receiving a sample fingerprint pattern on the substrate;
comparing the sample fingerprint pattern to a plurality of stored reference fingerprint patterns;
outputting a signal indicating a match between the sample fingerprint pattern and the stored reference fingerprint pattern; and
performing the pre-programmed function only after the match has been found between the sample fingerprint pattern and the reference fingerprint pattern.

17. The method according to claim 15, further including:
receiving a sample fingerprint pattern on the substrate;
comparing the sample fingerprint pattern to a plurality of stored reference fingerprint patterns;
outputting a signal indicating whether or not there is a match between the sample fingerprint pattern and the stored reference fingerprint pattern; and
permitting the performing of selected pre-programmed functions before the match has been found between the sample fingerprint pattern and the reference fingerprint pattern.

18. The method according to any one of claims 16 or 17, further including:
transmitting a code representing the function to be performed from a location adjacent the substrate to an automobile to perform selected functions at the automobile.

19. The method according to claim 18 wherein one of the functions performed is to lock the doors of the automobile.

20. The method according to claim 19 wherein the function of locking the doors is permitted to be performed before the match is found.

21. The method according to claim 18 wherein one of the functions performed is to unlock the doors of the automobile.

22. The method according to claim 15, further including:
sensing if a first touch occurred in a bottom portion of the substrate; and
sensing if a last touch occurred in a top portion of the substrate.

23. The method according to claim 15, further including:
sensing if a first touch occurred in a central portion of the substrate; and
sensing if a last touch occurred in an outer portion of the substrate.

24. A method comprising:
receiving a fingerprint pattern at a substrate;
sensing the fingerprint pattern with a plurality of sensor cells;
comparing the sensed fingerprint pattern to plurality of stored patterns to determine if there is a match between the received fingerprint pattern and a stored fingerprint pattern;
receiving a command input to the same substrate after the fingerprint pattern has been received;
sensing the command input with at least some of the same sensor cells used to sense the fingerprint pattern; and
sending a signal to carry out the command input only if the previously received fingerprint pattern is a match with a stored fingerprint pattern.

25. The method according to claim 24 in which a first command signal is output if the received command is in a first location on the substrate and a second command signal is output if the received command is in a second location on the substrate.

26. A method of performing user identification and receiving command inputs of a plurality of commands using the same substrate comprising:
placing sensors on a substrate in a first mode of operation for recognition of a fingerprint pattern;
receiving a fingerprint pattern on the substrate;
comparing the fingerprint pattern to a plurality of stored patterns to determine if there is match with a stored pattern;
switching to a second mode of operation if there is match to a stored fingerprint pattern to permit a user to input commands using the same substrate; and
receiving a plurality of commands to carry out a plurality of respective functions using the same sensors on the same substrate as used for the fingerprint pattern recognition.

27. The method according to claim 26 in which the first mode of operation is a recognition mode and the second mode of operation is a command input mode.

28. An apparatus comprising:
a substrate having a plurality sensor elements thereon;
means for configuring the sensor elements to output a signal representative a fingerprint pattern;
means for recognizing whether the fingerprint pattern matches a stored fingerprint pattern;
means for outputting a recognition signal if an input fingerprint pattern matches a stored pattern;
means for receiving a plurality of command inputs at the same substrate after the change mode signal has been output, the command inputs being received using the same sensor elements that were used to perform the fingerprint recognition; and
means for sending out a command signal to carry out a received command the sending means being operational only after an input fingerprint patter has been found to match a stored fingerprint pattern.

29. The apparatus according to claim 28 further including:
means for receiving a first selected group of commands prior to the recognition signal being output.

30. The apparatus according to claim 29 in which the lock command is within the first selected group.

31. An apparatus for remotely controlling automobile functions comprising:
a housing;
a semiconductor substrate coupled to and supported by the housing;
a plurality of position sensing devices positioned within the semiconductor, the position sensing devices being organizable into a plurality of segmented groups; and
a fingerprint recognition circuit coupled to the semiconductor substrate to recognize the patter of a fingerprint on the position sensing devices and output a signal indicating a match;
a command receiving circuit coupled to each group to sense whether a human appendage is adjacent the group.

* * * * *